US012134927B2

(12) United States Patent
Haupt

(10) Patent No.: US 12,134,927 B2
(45) Date of Patent: Nov. 5, 2024

(54) VEHICLE FORCE MEASUREMENT ASSEMBLY

(71) Applicant: NISSAN NORTH AMERICA, INC., Franklin, TN (US)

(72) Inventor: James Haupt, Livonia, MI (US)

(73) Assignee: Nissan North America, Inc., Franklin, TN (US)

(*) Notice: Subject to any disclaimer, the term of this patent is extended or adjusted under 35 U.S.C. 154(b) by 0 days.

(21) Appl. No.: 18/162,573

(22) Filed: Jan. 31, 2023

(65) Prior Publication Data

US 2024/0254820 A1 Aug. 1, 2024

(51) Int. Cl.
*E05F 15/41* (2015.01)

(52) U.S. Cl.
CPC .......... *E05F 15/41* (2015.01); *E05Y 2400/55* (2013.01); *E05Y 2900/546* (2013.01)

(58) Field of Classification Search
CPC ......... E05F 15/41; E05F 15/622; E05F 15/70; E05F 1/1091; E05Y 2400/55; E05Y 2900/546
See application file for complete search history.

(56) References Cited

U.S. PATENT DOCUMENTS

| | | | | |
|---|---|---|---|---|
| 6,719,356 | B2 * | 4/2004 | Cleland | E05F 1/1091 49/339 |
| 6,877,791 | B2 * | 4/2005 | Greuel | E05F 15/70 296/146.4 |
| 7,393,040 | B2 * | 7/2008 | Guillez | F15B 15/1457 296/76 |
| 8,027,769 | B2 * | 9/2011 | Oualkadi | E05F 15/622 49/340 |
| 9,840,863 | B2 * | 12/2017 | Ruby, III | E05F 5/08 |
| 2003/0030299 | A1 * | 2/2003 | Cleland | E05F 15/41 296/146.8 |
| 2004/0113456 | A1 * | 6/2004 | Greuel | E05F 15/70 296/146.8 |
| 2005/0156446 | A1 * | 7/2005 | Guillez | F15B 15/1457 296/76 |
| 2020/0248493 | A1 * | 8/2020 | Kamemoto | E05F 15/41 |
| 2021/0230921 | A1 * | 7/2021 | Battlogg | B60R 21/0136 |

* cited by examiner

*Primary Examiner* — Justin B Rephann
(74) *Attorney, Agent, or Firm* — Global IP Counselors, LLP

(57) ABSTRACT

A vehicle force measurement assembly includes a first rod, a second rod and an electronic controller. The first rod has a strain gauge mounted thereon. The first rod is dimensioned and configured to install to a first side of a vehicle door and a first side of a door opening of a vehicle body structure. The second rod is dimensioned and configured to install to a second side of the vehicle door and a second side of the door opening. The electronic controller is connected to the strain gauge and is wired and configured to detect forces applied to the first rod by the vehicle door in response to predetermined amounts of force being applied to the vehicle door.

7 Claims, 8 Drawing Sheets

VEHICLE FORCE MEASUREMENT ASSEMBLY

BACKGROUND

Technical Field

The present disclosure generally relates to a vehicle force measurement assembly. More specifically, the present disclosure relates to a vehicle force measurement assembly that is designed and dimensioned to replace lift supports for a rear door such that predetermined forces can be applied to the door in order to measure resulting forces applied to the lift supports.

Background Information

The geometry and kinematic movement of a rear door of a vehicle makes it difficult to determine the actual forces being applied to various structures that support the rear door in a variety of situations.

SUMMARY

One object of the present disclosure is to provide a structure and electronic controller that can accurately measure the amount of forces being applied to a rear door and the structures that support the rear door.

In view of the state of the known technology, one aspect of the present disclosure is to provide a vehicle force measurement assembly with a first rod, a second rod and an electronic controller. The first rod has a strain gauge mounted thereon. The first rod is dimensioned and configured to install to a first side of a vehicle door and a first side of a door opening of a vehicle body structure. The second rod is dimensioned and configured to install to a second side of the vehicle door and a second side of the door opening. The electronic controller is connected to the strain gauge and is wired and configured to detect forces applied to the first rod by the vehicle door in response to predetermined amounts of force being applied to the vehicle door.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
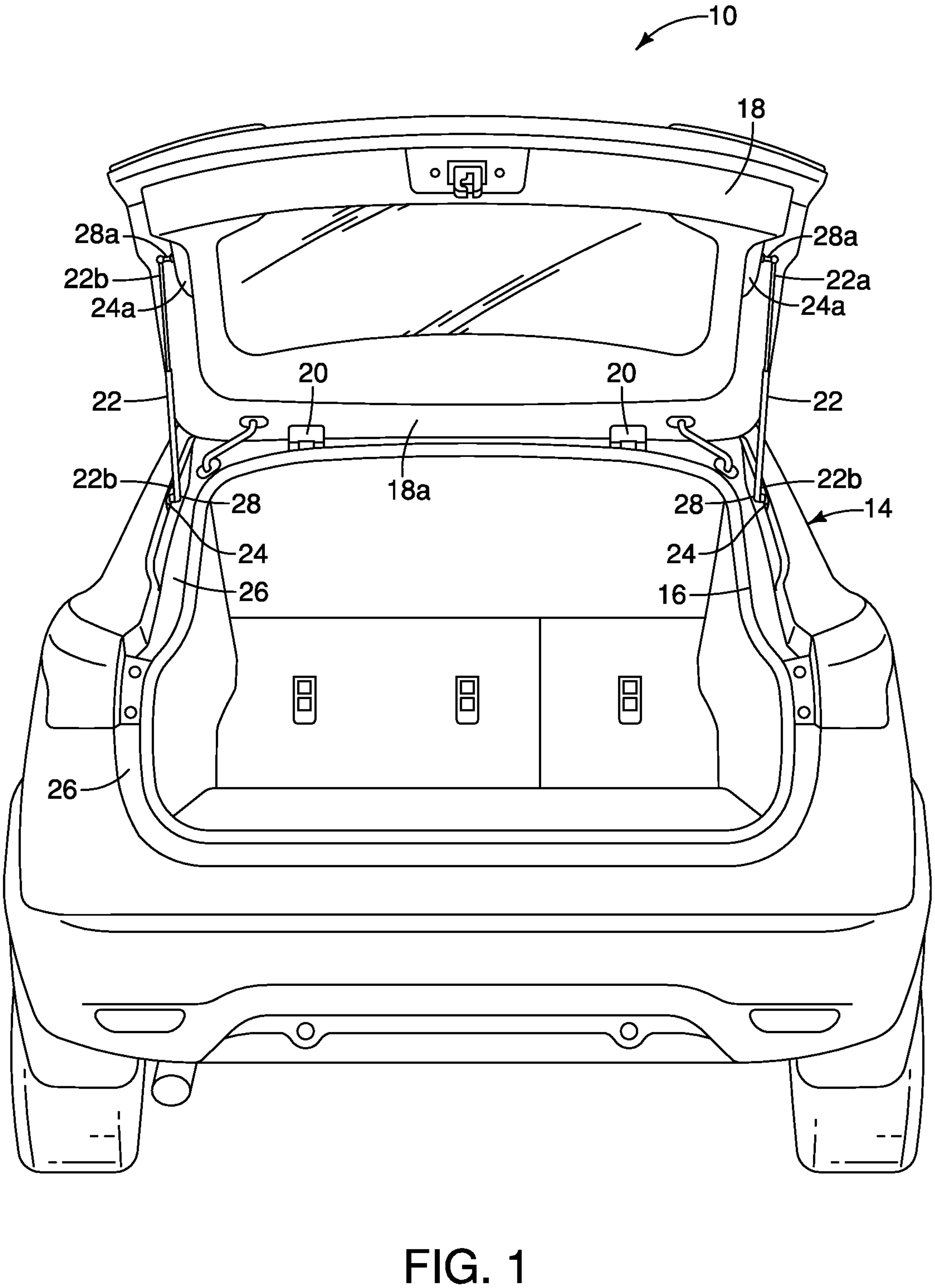
FIG. 1 is a rear view of a vehicle showing a rear door and lift supports that connect the door to the rear of the vehicle for improving opening and closing of the rear door in accordance with an exemplary embodiment.
Figure 2:
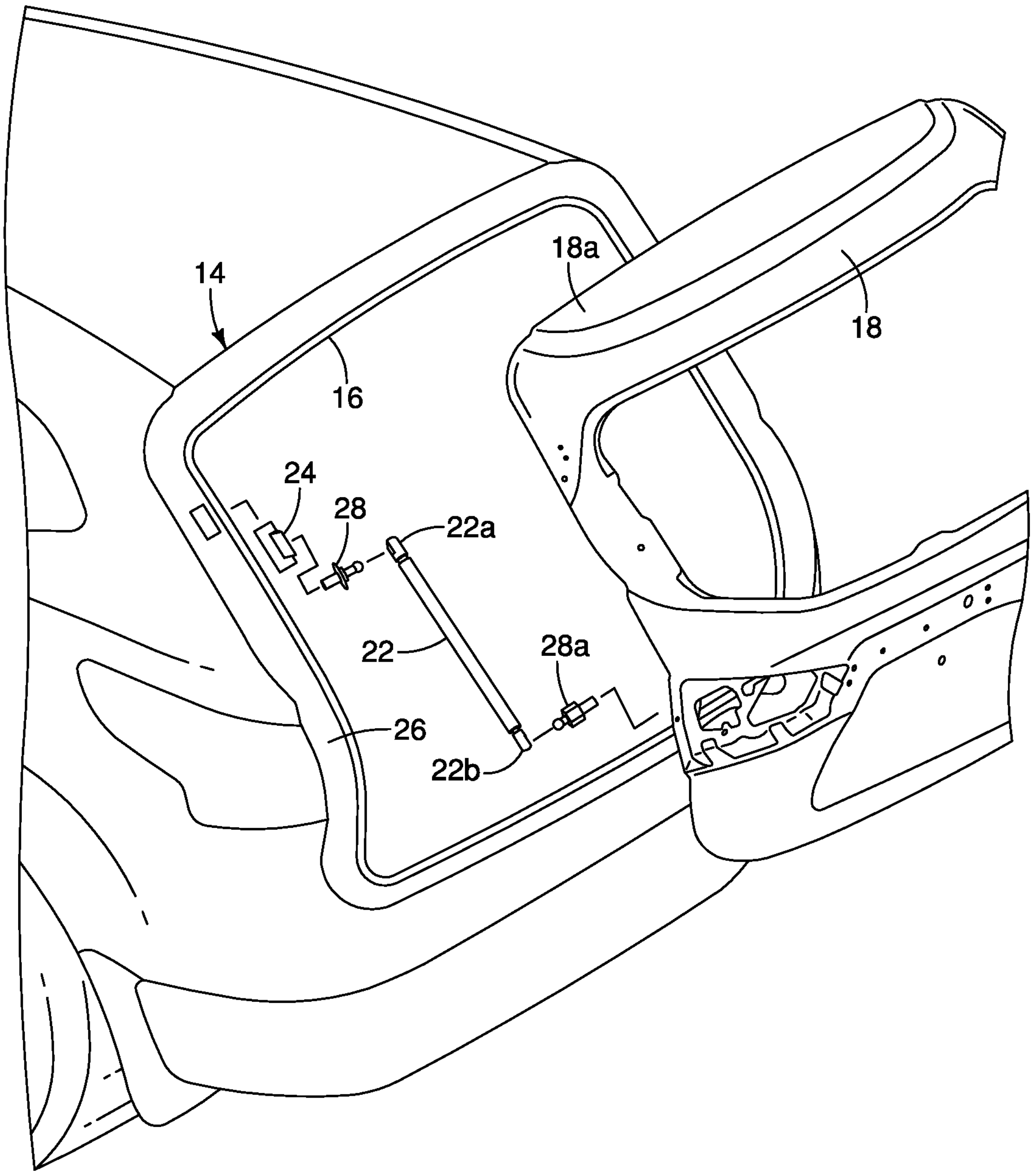
FIG. 2 is a perspective exploded view of the rear of the vehicle showing the rear door, the rear of the vehicle, a lift support and ball studs that connect the lift support to the rear of the vehicle and the rear door in accordance with the exemplary embodiment.
Figure 4:
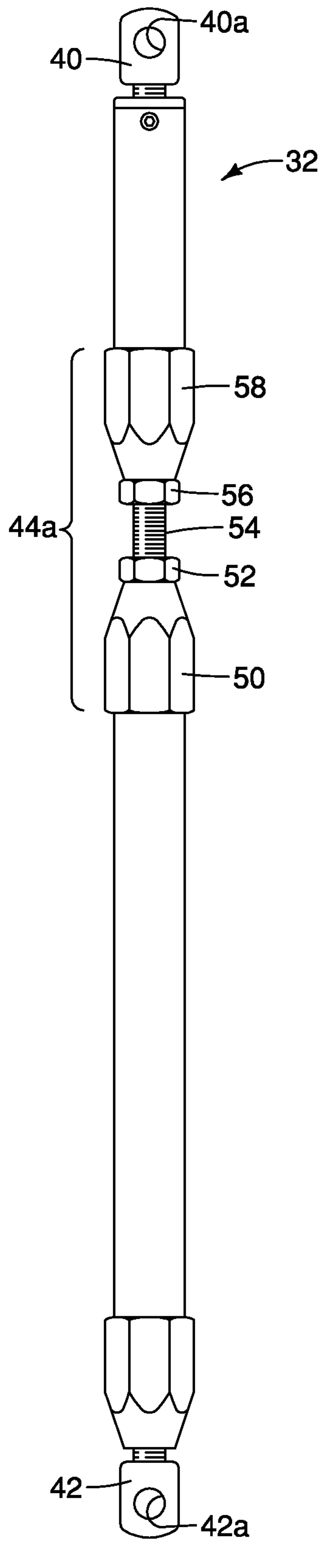
FIG. 4 is a side view of a second rod of the vehicle force measurement assembly showing another length adjusting structure in accordance with the exemplary embodiment.
Figure 5:
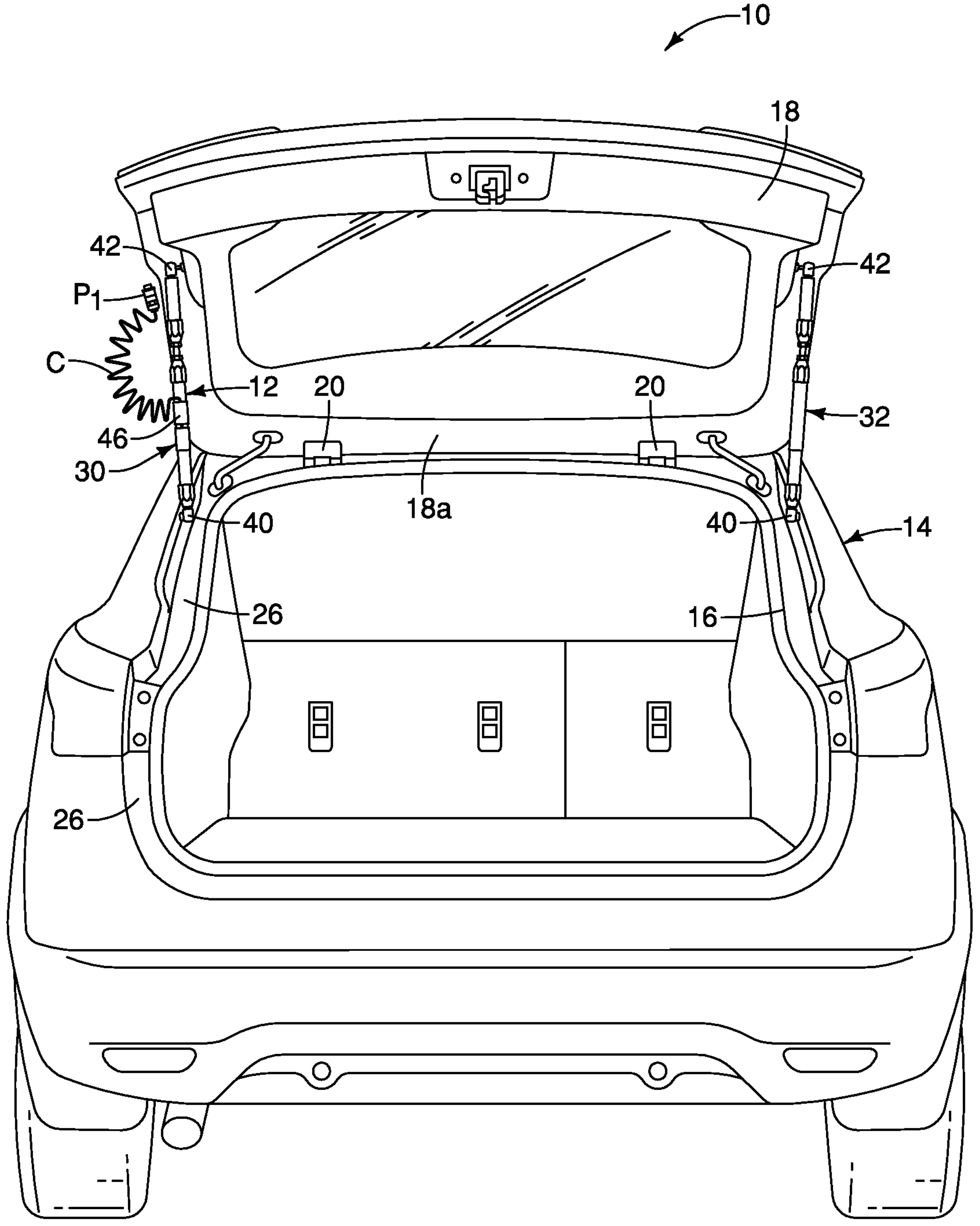
FIG. 5 is a rear view of the vehicle with the lift supports removed and the first rod and the second rod installed in their place in accordance with the exemplary embodiment.

Referring initially to FIGS. 1, 2 and 5, a vehicle 10 and a vehicle force measurement assembly 12 (FIG. 3-5) are illustrated in accordance with an exemplary embodiment.

The vehicle 10 includes a vehicle body structure 14 having a rear area that defines a rear opening 16. A door 18 is attached to the vehicle body structure 14 above the rear opening 16 by hinges 20 that support the door 18 for movement between an open orientation, a closed orientation and a plurality of locations between the open orientation and the closed orientation. In FIG. 1, the door 18 is also supported by, for example, conventional linear pneumatic rods or lift supports 22 (also known as gas springs or liftgate supports or struts) that assist in the opening of the door 18.

The door 18 (also referred to as a liftgate 18) in the depicted embodiment is a rear hatch door where the hinges 20 are located above the rear opening 16 and attach to an upper or top portion 18*a* of the door 18 (the top corresponding the door 18 being in the closed orientation).

As shown in FIG. 2, vehicle body structure 14 is provided with brackets 24 that are welded to a portion 26 of the vehicle body structure 14, the portion 26 at least partially surrounding and defining the rear opening 16. The hinges 20 are also attached to the portion 26. Ball studs 28 are attached to the brackets 24. The door 18 is provided with brackets 24*a* (FIG. 1) with additional ball studs 28*a* (FIG. 1). First ends 22*a* of respective ones of the lift supports 22 are fitted to ball studs 28 and second ends 22*b* of the lift supports 22 are fitted to the ball studs 28*a*.

A description of the vehicle force measurement assembly 12 is now provided with specific reference to FIGS. 3-9. The vehicle force measurement assembly 12 basically includes a first rod 30, a second rod 32 and an electronic controller 34.

Basically, the force measurement assembly 12 is installed to the vehicle 10 by first removing the lift supports 22 and replacing them with the first rod 30 and the second rod 32, as shown in FIG. 5 and described further below.

Figure 3:
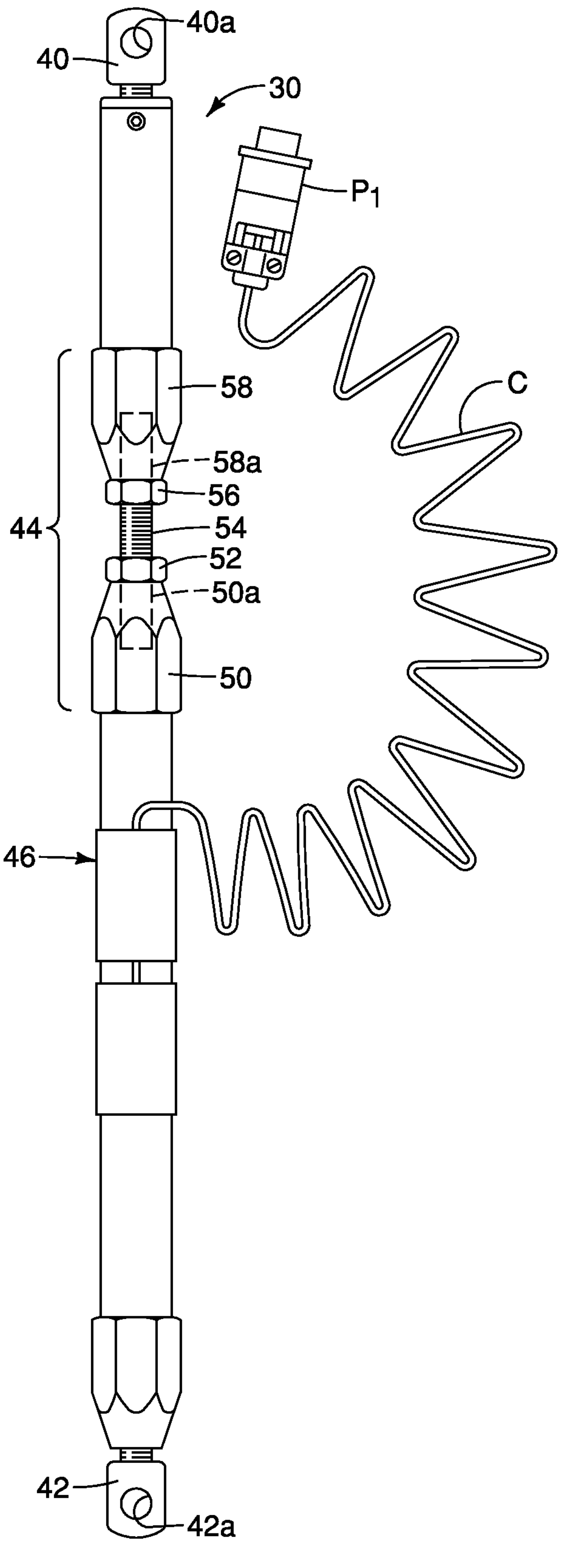
FIG. 3 is a side view of a first rod of the vehicle force measurement assembly showing a length adjusting structure and a strain gauge array of the first rod in accordance with the exemplary embodiment.

As shown in FIG. 3, the first rod 30 has a first end 40, a second end 42, a length adjusting structure 44 and a sensor receiving portion 46. The first end 40 has an opening 40*a* dimensioned and shaped to receive and retain one of the ball studs 28, thereby retaining the first end 40 to the vehicle body structure 14. The connection between the ball stud 28 and the first end 40 of the first rod 30 is configured to allow the first rod 30 to pivot about the ball stud 28. The second end 42 of the first rod 30 also has an opening 42*a* that is dimensioned and shaped to receive and retain one of the ball studs 28*a*, thereby retaining the second end 42 to the vehicle body structure 14. The connection between the ball stud 28*a* and the second end 4*s* of the first rod 30 is configured to allow the first rod 30 to pivot about the ball stud 28*a*.

The length adjusting structure 44 includes a large threaded nut 50, a locking nut 52, a threaded rod 54, another locking nut 56 and a large nut 58. The large threaded nut 50 is fixed via mechanical attachment structures or welding to the second end 42. The locking nut 52 and the locking nut 56 are threaded onto the threaded rod 54. The large nut 58 is fixed via mechanical attachment structures or welding to the first end 40. The large nut 50 and the large threaded nut 58 include internal threads dimensioned and shaped to engage and retain respective ends of the threaded rod 54 therein.

In order to adjust the length of the first rod 30, the first end 40 and/or the second end 42 are rotated relative to the threaded rod 54 in order to achieve the desired length. Thereafter, the locking nuts 52 and 56 are tightened against the first end 40 and the second end 42, respectively.

The first length adjusting structure 44 provides the first rod 30 with the ability to be adjustable to any of a plurality of overall lengths.

Similarly, the second rod 32 includes a second length adjusting structure 44*a* that is basically the same as the first length adjusting structure 44 of the first rod 30. In other words, the second length adjusting structure 44*a* includes the large threaded nut 50, the locking nut 52, the threaded rod 54, the locking nut 56 and the large nut 58. Since the second length adjusting structure 44*a* is basically identical to the first length adjusting structure 44, description is omitted for the sake of brevity.

The second rod 32 also includes ends that are the same as the first end 40 with opening 40*a* and the second end 42 with opening 42*a*. Therefore, further description of the second rod 32 is omitted for the sake of brevity.

Figure 6:
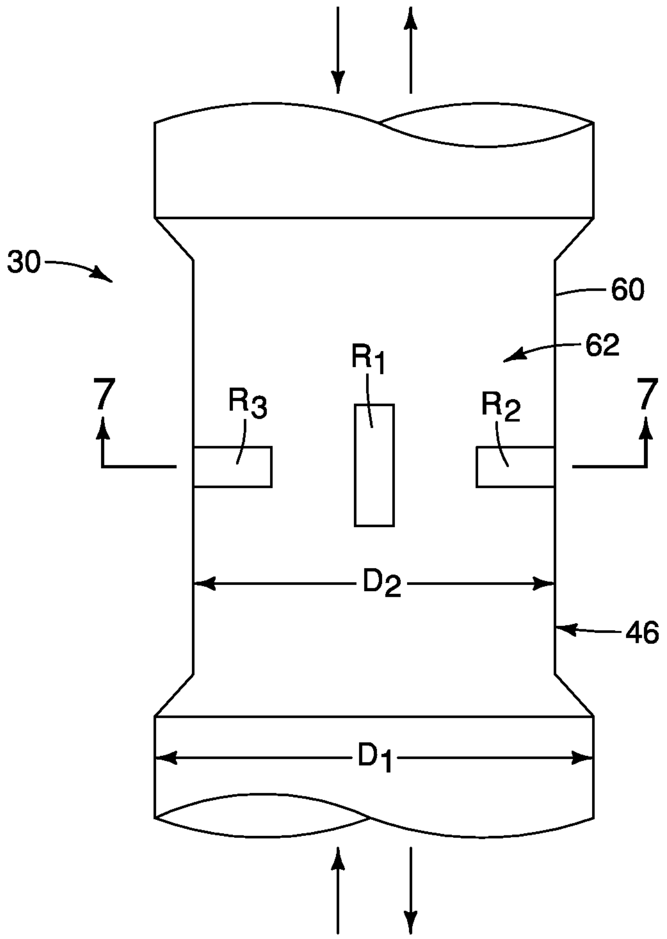
FIG. 6 is a side view of a portion of the first rod showing the strain gauge array in accordance with the exemplary embodiment.

The first rod 30 and the second rod 32 are basically the same except that the first rod 30 includes the sensor receiving portion 46. As shown in FIG. 6, the sensor receiving portion 46 is located within a reduced diameter portion 60 of the first rod 30. An array of strain gauges 62 are installed to the reduced diameter portion 60 of the sensor receiving portion 46.

Figure 7:
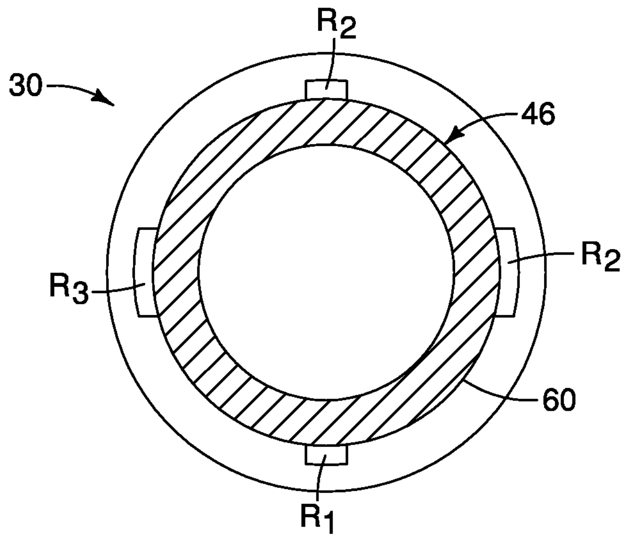
FIG. 7 is a cross-sectional view taken along the line 7-7 in FIG. 6 showing further details of the strain gauge array in accordance with the exemplary embodiment.
Figure 8:
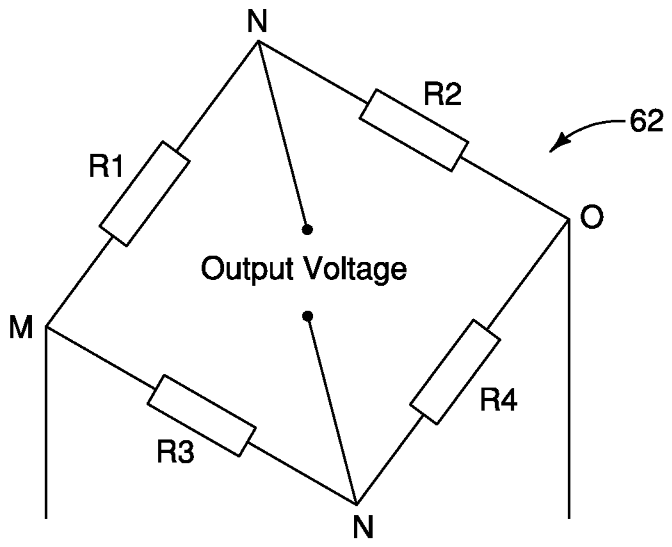
FIG. 8 is a wiring diagram of the strain gauge array in accordance with the exemplary embodiment.
Figure 9:
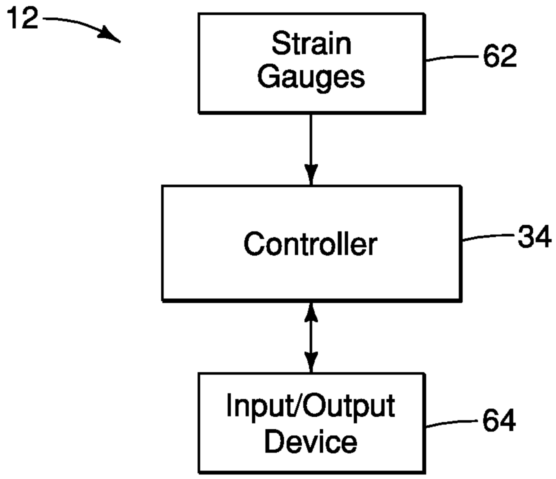
FIG. 9 is a block diagram showing the strain gauge array electronically connected to an electronic controller that includes an input/output device in accordance with the exemplary embodiment.

The array of strain gauges 62 includes a first gauge R1, a second gauge R2, a third gauge R3 and a fourth gauge R4, as shown in FIGS. 6 and 7. As shown in FIG. 8, the strain gauges R1, R2, R3 and R4 are wired together in a manner similar to a Wheatstone bridge circuit. The array of strain gauges 62 are further connected to a controller 34 and an input/output device 64, as shown in FIG. 9.

The controller 34 is an electronic controller configured to monitor output from the array of strain gauges 62 and record the output correlated to force of forces applied to the door 18, as described below.

The controller 34 preferably includes a microcomputer with a strain gauge measurement programming and control program that controls and interfaces with the array of strain gauges 62 and the input/output device 64. The controller 34 can also include other conventional components such as an input interface circuit, an output interface circuit, and storage devices such as a ROM (Read Only Memory) device and a RAM (Random Access Memory) device.

The force measurement assembly 12 operates as follows.

As shown in FIG. 5, the first rod 30 is installed to the ball studs 28 and 28*a* on one side of the rear of the vehicle 10 such that the first rod 30 extends between the door 10 and the vehicle body structure 14. Similarly, the second rod 32 is installed to the ball studs 28 and 28*a* on a second side of the rear of the vehicle 10. The first rod 30 and the second rod 32 are adjusted to the same overall lengths.

Next, the plug P1 connected to the cable C (which is further connected to the array of strain gauges 62) is connected to the controller 34. The controller 34 is turned on and data collection can commence.

The data collection includes the electronic controller 34 detecting forces applied to the first rod 30 by the vehicle door 18 in response to predetermined amounts of force being applied to the vehicle door 18 itself.

Figure 10:
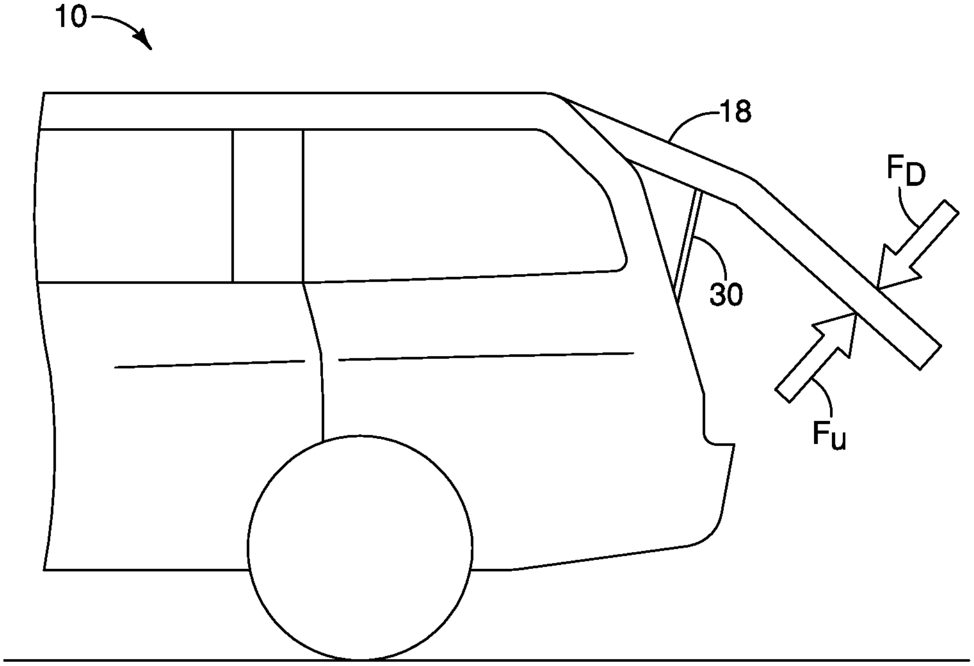
FIG. 10 is a schematic side view of the vehicle showing the rear of the vehicle, the first rod having the strain gauge array and the rear door with the rear door opened to a first position and held in place by the first and second rods such that a plurality of tests can be conducted by applying differing levels of downward forces on the door, determining and storing the measurements made by the strain gauges for each downward force applied and repeating for a plurality of upward forces applied to the door in accordance with the exemplary embodiment.

An example of the data collection process is demonstrated in FIG. 10. In FIG. 10, the door 18 is locked in a first position such that the door is partially opened. The angle of the door 18 relative to vertical or horizontal is entered via the input/output device 64 into the controller 34 as is a predetermined first force $F_D$. The first force $F_D$ is then applied to the door 18 by a person or robot. The controller 34 determines the force or forces being measured by the array of strain gauges 62 on the first rod 30 and records the forces correlated to the angle of the door 18 and the amount of force $F_D$ applied to the door 18. This procedure can be repeated as desired or needed for differing levels of ford $F_D$.

The data collected provides a direct way of determining the forces being applied to the ball studs 28 and 28*a*, the brackets 24 and brackets 24*a*, the area of the door 18 where the brackets 28*a* are attached and the area of the vehicle body structure 14 where the brackets 28 are attached.

A further test with the door 18 in the first position depicted in FIG. 10 is application of a predetermined level of force or forces $F_u$ upward from beneath the door 18. Data can be collected for a variety of levels of force.

Figure 11:
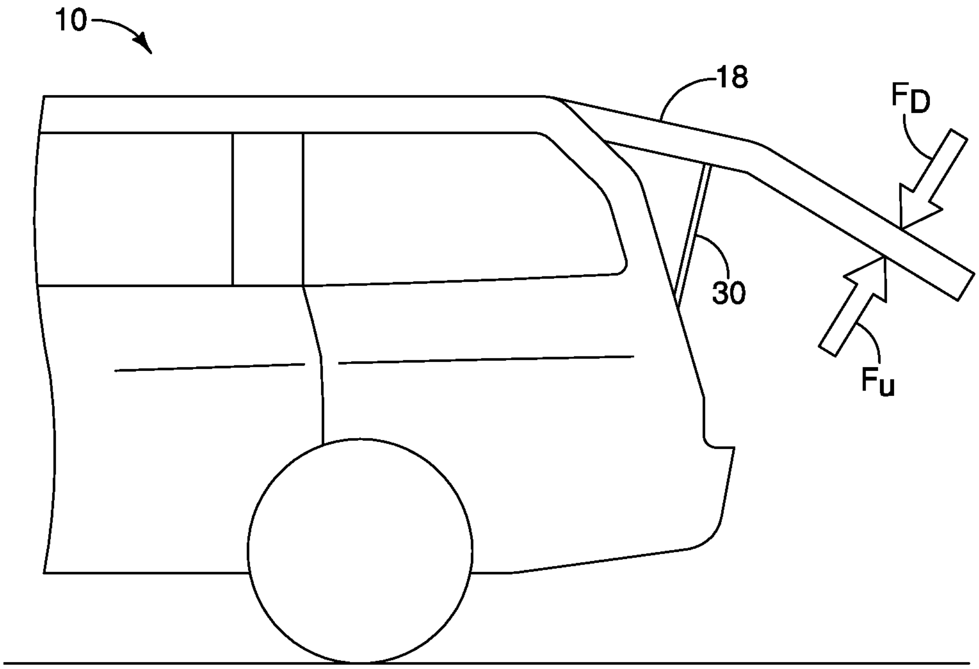
FIG. 11 is a second schematic side view of the vehicle similar to FIG. 10 showing the rear door raised from the first position to a higher second position by the first and second rods such that a plurality of further tests can be conducted by applying differing levels of downward forces on the door, determining and storing the measurements made by the strain gauges for each downward force applied and repeating for a plurality of upward forces applied to the door in accordance with the exemplary embodiment.

Next, as shown in FIG. 11, the first and second rods 30 and 32 can have their lengths increase thereby moving the door 18 to a second position. Again, repeated tests of downward forces $F_D$ and upward levels of force $F_u$ can be applied to the door 18 with corresponding forces on the door 18 and ball studs 28 and 28*a* being determined by the controller 34 based on the output from the array of strain gauges 62.

Figure 12:
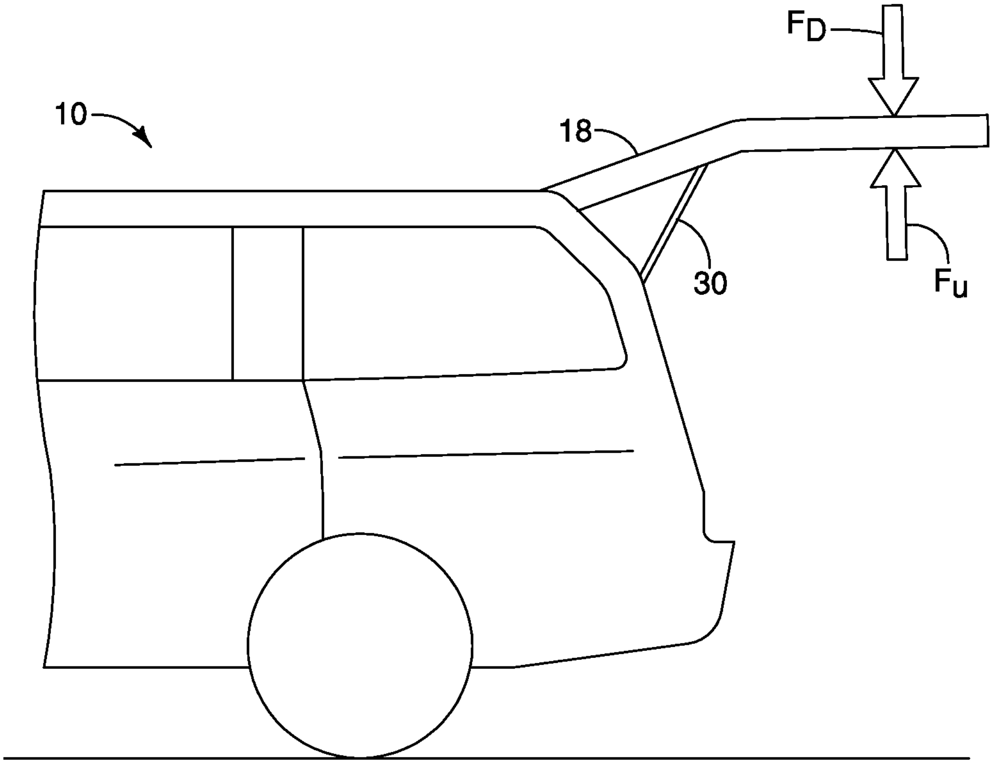
FIG. 12 is a third schematic side view of the vehicle similar to FIGS. 10 and 11 showing the rear door raised from the second position to a higher third position by the first and second rods such that a plurality of further tests can be conducted by applying differing levels of downward forces on the door, determining and storing the measurements made by the strain gauges for each downward force applied and repeating for a plurality of upward forces applied to the door in accordance with the exemplary embodiment.
Figure 13:
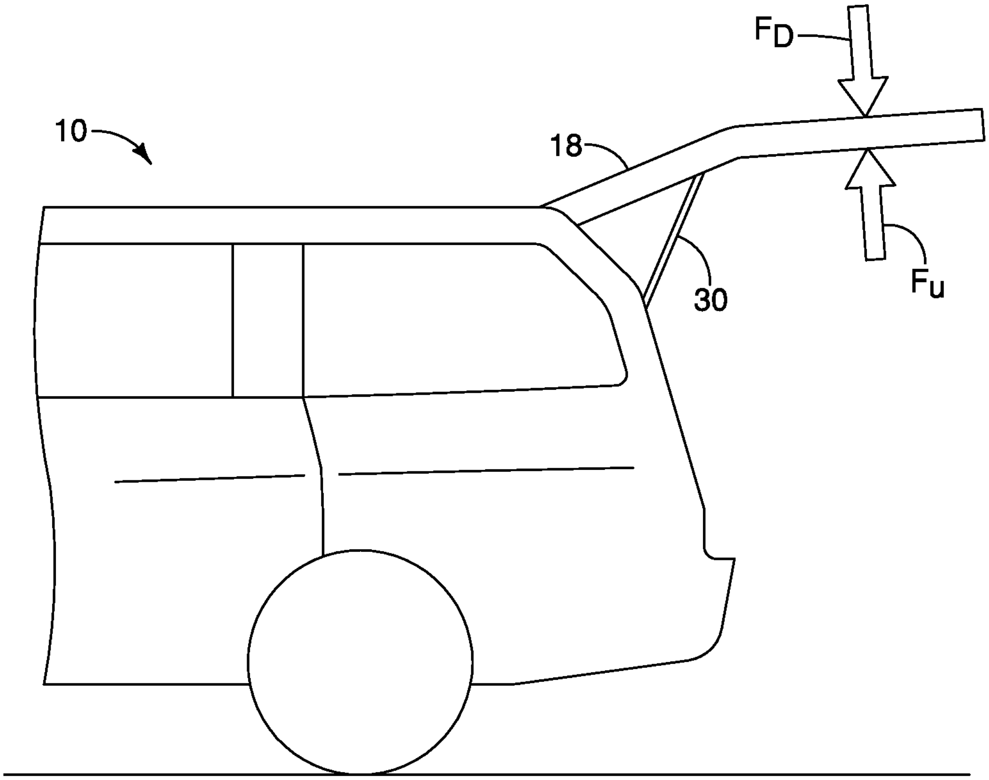
FIG. 13 is a fourth schematic side view of the vehicle similar to FIGS. 10-12 showing the rear door raised from the third position to a higher fourth position by the first and second rods such that a plurality of further tests can be conducted by applying differing levels of downward forces on the door, determining and storing the measurements made by the strain gauges for each downward force applied and repeating for a plurality of upward forces applied to the door in accordance with the exemplary embodiment.

Further, as shown in FIGS. 12 and 13 the first and second rods 30 and 32 can have their lengths increase thereby moving the door 18 to third and fourth positions. Again, further repeated tests of downward forces $F_D$ and upward levels of force $F_u$ can be applied to the door 18 in the third and fourth positions with corresponding forces on the door 18 and ball studs 28 and 28*a* being determined by the controller 34 based on the output from the array of strain gauges 62.

Hence, the electronic controller 34 is wired and configured to detect signals from the strain gauge 62 and determine the level of force applied to the first rod 30 by the vehicle door 18 at multiple locations (positions) corresponding to a plurality of positions between the open position and the closed position of the vehicle door 18 in response to predetermined amounts of force being applied to the vehicle door 18 in a downward directions and upward direction. The electronic controller 34 measures, receives input data, records and stores each determined level of force with each level of detected force, the position of the door 18 when data is collected and whether the force was applied downward or upward (corresponding, for example, to a person lifting the door 18 with excessive force).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle force measurement assembly. Accordingly, these terms, as utilized to describe the present invention should be interpreted relative to a vehicle equipped with the vehicle force measurement assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle force measurement assembly, comprising:

a first rod having a strain gauge mounted thereon, the first rod being dimensioned and configured to install to a first side of a vehicle door and a first side of a door opening of a vehicle body structure;

a second rod being dimensioned and configured to install to a second side of the vehicle door and a second side of the door opening, the first rod and the second rod each including a length adjusting structure such that the first and second rods are adjusted to a plurality of differing fixed lengths thereby non-movably fixing the vehicle door to any of a plurality of positions between an open position of the vehicle door and a closed position of the vehicle door, each position of the plurality of positions defining a corresponding angle of a plurality of angles of the vehicle door relative to the first side of the door opening; and an electronic controller connected to the strain gauge and being wired and configured to detect forces applied to the first rod by the vehicle door in response to predetermined amounts of force being applied to the vehicle door at each angle of the plurality of angles, the electronic controller recording force detected by the strain gauge at each angle of the plurality of angles correlating the force detected to a corresponding angle of the plurality of angles.

2. The vehicle force measurement assembly according to claim 1, wherein each of the length adjusting structures includes a threaded rod fixed to one end of a corresponding one of the first and second rods, the threaded rod being threaded into a threaded opening in the corresponding one of the first and second rods.

3. The vehicle force measurement assembly according to claim 1, wherein the electronic controller is wired and configured to measure and record forces applied to the strain gauge in response to differing levels of force applied to the vehicle door at each of the plurality of positions of the vehicle door.

4. The vehicle force measurement assembly according to claim 1, wherein the electronic controller is wired and configured to measure and record forces applied to the strain gauge in response to a predetermined level of force applied to the vehicle door with the vehicle door being moved to a plurality of differing positions relative the vehicle body structure.

5. The vehicle force measurement assembly according to claim 1, wherein the first rod includes a first end, a second end and a sensor receiving portion located between the first end and the second end, the sensor receiving portion having a reduced diameter compared to a remainder of the first rod with the strain gauge being installed to the sensor receiving portion.

6. The vehicle force measurement assembly according to claim 1, wherein the length adjusting structure of the first rod and the length adjusting structure of the second rod are configured and dimensioned such that the first rod is adjustable to any of the plurality of differing fixed lengths and the second rod is adjustable to have an overall length that corresponds to the length of the first rod after the first rod has been adjusted to a predetermined one of the plurality of differing fixed lengths.

7. The vehicle force measurement assembly according to claim 1, wherein the first rod is further dimensioned and configured to install to the first side of a vehicle door via a ball stud and a bracket fixed to the area of the vehicle door, and the electronic controller is further configured determine the forces acting on the ball stud and the bracket at the plurality of differing angles and record detected forces correlated to corresponding ones of the plurality of differing angles of the vehicle door.

* * * * *